Dec. 17, 1929.   V. O. CORNWELL ET AL   1,739,825
PROCESS FOR PRODUCING CRACKLED GLASSWARE
Filed March 5, 1928   2 Sheets-Sheet 1
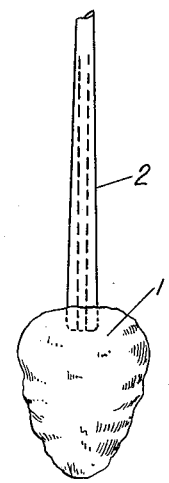
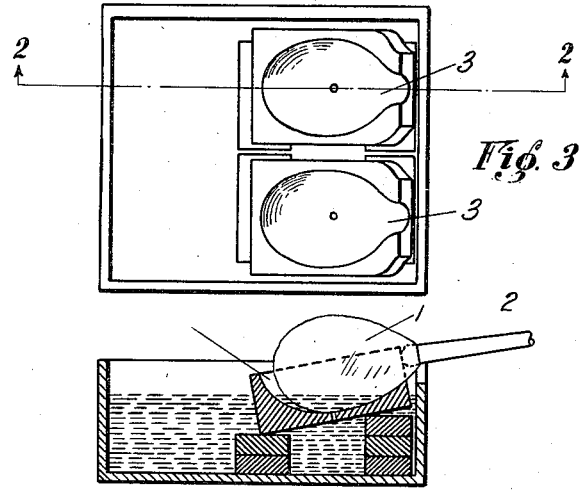
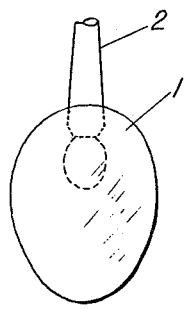
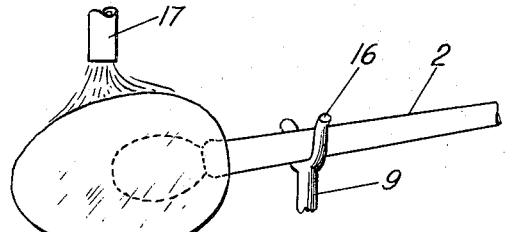
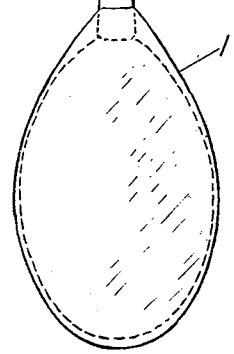
INVENTORS
Fred J. Blackburn.
Virgil O. Cornwell.
BY
ATTORNEY.

Dec. 17, 1929. V. O. CORNWELL ET AL 1,739,825
PROCESS FOR PRODUCING CRACKLED GLASSWARE
Filed March 5, 1928 2 Sheets-Sheet 2

INVENTORS
Fred J. Blackburn.
Virgil O. Cornwell.
BY
ATTORNEY.

Patented Dec. 17, 1929

1,739,825

UNITED STATES PATENT OFFICE

VIRGIL O. CORNWELL AND FRED J. BLACKBURN, OF COLUMBUS, OHIO, ASSIGNORS TO THE FEDERAL GLASS COMPANY, OF COLUMBUS, OHIO, A CORPORATION OF OHIO

PROCESS FOR PRODUCING CRACKLED GLASSWARE

Application filed March 5, 1928. Serial No. 259,198.

Our invention relates to a process for producing crackled glassware. This method consists in covering the outer surface of a blank with a network of fine lines and cracks which are subsequently enlarged when the blank is shaped to final form.

Heretofore, in the manufacture of crackled glassware by hand, various methods have been used. Crackled glassware produced by these methods have a series of cracks which extend quite deeply into the surface of the article, with the result that glassware made by these methods is very easily broken, liable to crack off or chip and has other defects.

In glassware made by our method, however, we have obviated these serious cracks which extend to such a depth in the ware. While having the outward appearance of the ordinary crackled ware, it is found under the microscope that the crackles in the ware produced by our method are not really cracks at all but are a series of very fine hairline furrows or troughs in the glass which are confined to the outer surface of the glass article and do not penetrate the glass so as to weaken the article or to cause stresses or strains which will be the cause of undue breakage of the articles, as is now the case with crackled ware articles made by the present hand methods.

Another object of our invention is the manufacture of crackled glassware in which the crackles in the article manufactured may be regulated or controlled as to the size and appearance or design on the ware.

Still another object of our invention is the manufacture of crackled glassware in which the edges of the crackles on the bottom and around the top of the article of glassware are smooth. This will prevent scratching of surfaces, such as table tops, when the article is placed thereon or the cutting of the hands when drying or otherwise handling the article.

This application is a continuation in part of our application Serial No. 127,659, filed August 6, 1926.

Other objects of our invention will appear from the following description and its various features illustrated in the accompanying drawings wherein similar reference numerals designate corresponding parts in the several figures and wherein:

Figure 1 is a fragmentary elevational view of a blow pipe showing a gather of glass thereon.

Figure 2 is a sectional view of a marvering block with blow pipe having a gather of glass which is being marvered.

Figure 3 is a plan view of the marvering block.

Figure 4 is a fragmentary elevational view of a blow pipe with a gather of glass thereon after the glass has been marvered in the marvering block and after a puff of air has been introduced into the gather.

Figure 5 is a fragmentary elevational view of a blow pipe with a gather of glass thereon and the blow pipe resting horizontally on a forked stand so that the gather of glass is directly under a blast of air from an air pipe.

Figure 6 is a fragmentary elevational view of a blow pipe with a glass gather thereon after having been marvered and the interior blown by the glass blower to obtain the length for the gather.

Figure 7:
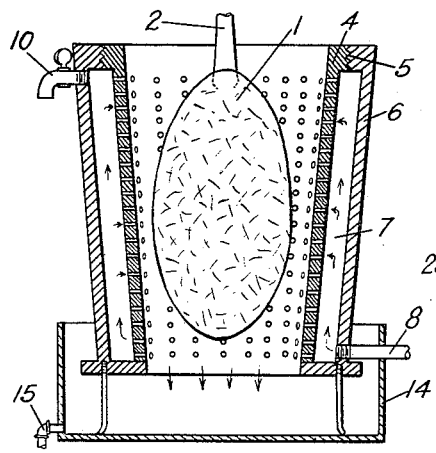
Figure 7 is a sectional view of a spray block into which the glass on the blow pipe has been inserted, subjecting the gather to a spray of water to produce the crackles on the blank.

In the performance of our method, a gather of glass 1 is taken from the furnace on a blow pipe 2 by the gathering boy, as shown in Figure 1. The gathering boy takes the gather of glass shown in Figure 1 and places it in what is known as the marvering block. This marvering block is shown in Figures 2 and 3, although marvering may be effected on either a marvering board, in the case of light articles, or, in the case of heavy articles, in what is known as a marvering block, usually a concave vessel of iron 3, as shown in Figures 2 and 3, covered with a paste to prevent the glass from sticking thereto, or from being scratched by the iron marvering block, and sprayed with, or otherwise subjected to water. The gather is placed in the marvering block as shown in Figure 2 and revolved first in one direction, and then in the other, until the gather is shaped as shown in Figure 4. With some articles of glassware the marvering operation is performed in a double block, as shown in Figure 3, the gathering boy placing the gather first in one marvering block, and partly marvering it, after which it is then changed to the other block, where the operation is completed.

In our method, after the charge of glass has been marvered in the marvering block until it has been formed into proper shape and after the gather boy has introduced the "puff" air, he then takes the blank with the air bubble therein, as shown in Figure 4, and hands it to the blower. The blower takes the blow pipe 2 having thereon the gather of glass 1 and holding the pipe in a vertical position with the glass depending therefrom, he further blows it to make the wall of the blank thinner. The blower now rests his blow pipe in a substantially horizontal position on a vertical stand consisting of a pipe 9 having a small fork 16 at its upper end to receive the blow pipe, as shown in Figure 5. The blow pipe in this horizontal position is first revolved in one direction and then in another and, during this revolving operation, the glass is subjected to a cooling draft of air from an air pipe 17 directly above the glass gather, as shown in Figure 5. When the glass has cooled sufficiently, the blower removes it from this cooling stand and, holding the pipe vertically with the cooled glass blank depending therefrom, he places his mouth to the upper end of the blow pipe and blows into the interior of the blank to obtain length, until the blank is shaped as shown in Figure 6.

In the next operation, with the blow pipe still in vertical position and the lengthened blank depending therefrom, the blower inserts the blank into the spray block, shown in Figure 7. This spray block, as shown in Figure 7 of the drawings, consists of a tapered circular metal member 4 having a series of small holes bored therein for substantially its entire length.

This circular member 4 is enlarged and threaded at its upper end as at 5 so as to screw down into an outer circular casing 6. This enlargement of the circular portion 4 results in spacing it from the outer member 6 so that a water chamber is formed entirely surrounding the said circular member 4 for substantially its entire length.

At the lower portion of the outer casing 6, a hole is drilled and a pipe 8 is threaded therein for the purpose of allowing water to flow into the water jacket surrounding the perforated member 4. At the opposite side of the jacket 6, near the upper end thereof, is a faucet 10 for the purpose of regulating the pressure of the water in the water jacket 7. It will be seen from the foregoing description that, when water is introduced through the pipe 8 into the water jacket 7 surrounding the perforated member 4, at the proper pressure, the water will escape from the water jacket 7 through the small perforated holes in the circular member 4 and form a spray in the interior of said perforated member 4. The force of this spray may be regulated to produce either a heavy sluggish spray of water in the interior of the spray block by opening the faucet 10 or it may be regulated by applying pressure to the water coming in at the pipe 8 to produce a very fine spray of water. The water from the spray falls into a pan 14, from which it is carried away by the drain pipe 15.

When the blower inserts the hot blank into this spray block, the spray of water forms fine crackles on the outer skin of the blank. These crackles when examined under a microscope, however, are found to be not cracks at all, but a series of very fine hair line furrows or troughs in the glass, which are confined to the outer surface of the glass and do not penetrate, to any material extent, into the interior of the glass, as is the case with crackled ware made by other hand processes. The edges of these crackles or hair line furrows are relatively sharp and, when the blank is blown to the final shape, these crackles or hair line furrows are greatly enlarged. The result is that such shape edges will, in many of the articles, project from the surface of the glass article to such an extent as to scratch or mar surfaces, such as table tops, on which the articles are placed. Also, such projecting sharp edges create a danger to the hands of the users.

To eliminate such undesirable feature, the article is subjected to blasts of heat immediately on being taken from the spray block. This is accomplished by placing the blow pipe 2 in a small fork 18, on the top of one of the legs of a U-shaped standard 19, so that the blank is substantially at the intersection of two blasts of heat emerging from heating elements 20 and 21 disposed on the legs of the U-shaped member.

Figure 8:
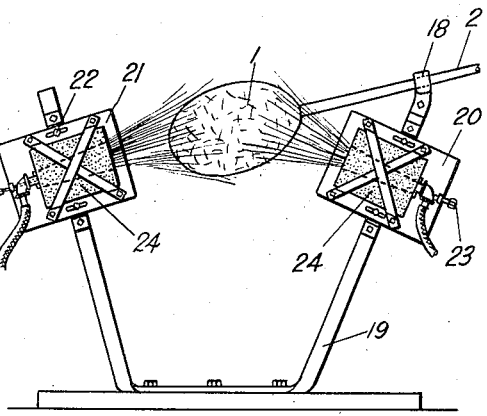
Figure 8 is a side view showing the means for subjecting the glass on the blow pipe to heat blasts, immediately after the glass is taken from the spray block to smooth the rough edges of the crackles at the base and around the top of the gather.
Figure 11:
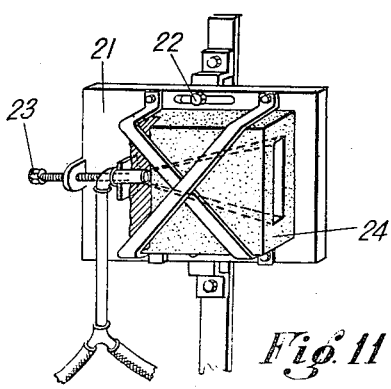
Figure 11 is a perspective view of one of the heat blast elements shown in Figure 8, showing more clearly the means for adjusting the elements to obtain the desired angularity of the blasts of heat.

These heating elements are adjustable in an arcuate path about their transverse axis to get the proper angle of blast, as shown in Figure 8. This adjustment may be made by loosening the bolts 22, tilting the heating element either up or down, and then tightening the bolts. Horizontal adjustment of each element is provided for by the bolt 23 (see Figures 8 and 11), which may be rotated in either direction to push the fire block 24 toward or allow it to be moved away from the opposite heating element.

Figure 9:
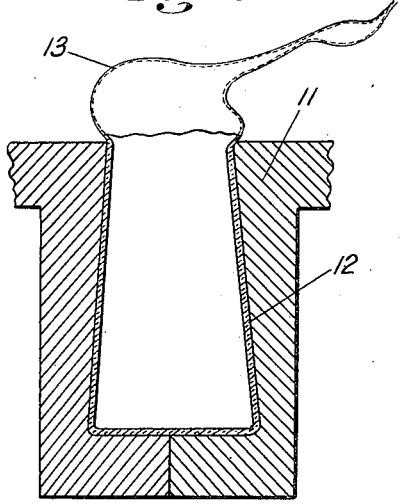
Figure 9 is a sectional view of the mold into which the gather shown in Figures 1, 2, 3, 4, 5, 6, 7, and 8 has been inserted for blowing the gather to the shape of the finished article.
Figure 10:
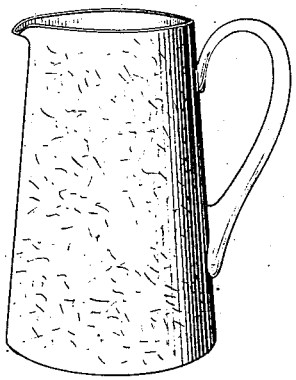
Figure 10 shows the finished articles with the crackles thereon.

The blank 1, after having been rotated in the blasts of heat for a sufficient length of time to smooth the sharp edges thereon, is inserted into the partible mold 11, shown in Figure 9, and blown to its final shape. Such article is then removed from the partible mold 11 by a worker and finished according to the usual hand method, which comprises inverting the finished blank 12 and scraping the top thereof across an iron cutter bar which scrapes off the very thin bubble of glass 13, shown in Figure 8. The boy then puts the finished blank in a glory hole to fire polish it, after which it is taken out by a finisher who smooths up the rim and puts the lip thereon with a hand tool. The article is then carried to another worker who molds a handle thereon. The article is then annealed.

It will thus be seen that we have devised a novel method of producing hand crackled ware which has the advantage over the old method of producing hand crackled ware, in that the crackles on articles produced by our method are only on the outer surface of the glass article and do not penetrate into the interior surface of the article such as are produced by present methods of making hand crackled ware, which cracks materially shorten the life of the article so made and make it likely to break by being subjected to the slight jars to which glassware is subjected by ordinary use. It has been found that the crackles in the ware produced by our method have a certain relation to the manner in which the article is sprayed. In other words, it has been found that the crackles on the finished article correspond to a certain extent to the lines of the sprays of water thrown against the outer surface of the hot blank so that certain designs or figures may be formed by crackles in the finished article by merely arranging the sprays of water in the shape or design that is desired to be reproduced upon the finished article. This is another advantage in our invention over the methods now in use for producing hand crackled ware. Furthermore, we have provided a means for eliminating the sharp edges of the crackles which may otherwise project from the surface to mar surfaces on which the articles are placed or cause damage to the hands in handling.

It will be understood that it is possible to vary our proposed method either by the omission of certain of the steps set forth in this specification or by the addition of other steps or by the omission of some steps and the addition of others. For instance, it has been found desirable under certain conditions to introduce the gather after it has been subjected to the water spray and before blowing to final form to the usual action of dipping in the conical corrugated optic mold which is common in the art. It will, likewise, be understood that marvering may be accomplished in various manners, depending upon the size and character of the articles being made. These various changes are all within the spirit of our invention.

It will be understood that various ways of applying the spray to the gather may be resorted to without, however, departing from the scope of our invention. As, for instance, instead of having a continuous spray into which the blank is dipped, the spray block may be arranged so that the spray is not turned on until after the blank is first placed within the spray block and, if desired, turned off before the blank is removed therefrom, the application of the spray being controlled by the blower by means of a foot lever or by any other well-known means. This or other modifications may be used without departing from the scope of our invention.

Having thus described our invention, what we claim is:

1. The method of producing crackled ware which comprises forcibly projecting fine streams of liquid against a glass blank.

2. The method of producing crackled ware which comprises subjecting the glass blank to converging sprays of liquid in the form of fine streams.

3. The method of producing crackled ware which comprises gathering a glass blank upon a tool, and throwing streams of water against the blank of a quality and quantity sufficient to produce crackles in the blank without changing the temperature of the blank to a degree that will prevent proper shaping thereof.

4. The method of producing crackled ware which comprises gathering glass upon a tool, marvering the gather, introducing air into the gather to form a hollow glass blank, and throwing streams of water against the hollow glass blank of a quality and quantity sufficient to produce crackles in the blank without changing the temperature of the blank to a degree that will prevent proper shaping thereof.

5. The method of producing crackled ware which comprises gathering glass upon a tool, marvering the gather, introducing air into the gather to form a hollow glass blank, and dipping the hollow glass blank into converging sprays of liquid in the form of fine streams.

6. The method of producing crackled ware which consists in gathering glass upon a blow pipe, marvering it, introducing air into the gather to form a hollow glass blank, cooling the gather with a blast of air, introducing air into the gather again to further expand the hollow glass blank, throwing streams of liquid against the hollow blank of a quality and quantity sufficient to produce crackles in the blank without changing the temperature of the blank to a degree that will prevent proper shaping thereof, then placing the hollow glass blank in a mold where it is blown to final shape, and then finishing the article in the usual manner.

7. The method of making crackled ware which consists in gathering glass upon a blow pipe, marvering it, introducing air into the gather to form a hollow glass blank, throwing streams of liquid against the hollow glass blank of a quality and quantity sufficient to produce crackling in the blank without changing the temperature of the blank to a degree that will prevent proper shaping thereof, then placing the blank in a mold where it is blown to final shape, and then finishing the article in the usual manner.

8. The method of producing crackled ware which comprises gathering glass upon a blow pipe, marvering it, introducing air into the gather to form a hollow glass blank, and subjecting the hollow glass blank to converging sprays of liquid in the form of fine streams before the blank is introduced into a mold.

9. The method of producing crackled ware which comprises subjecting a glass blank to converging sprays of liquid in the form of fine streams before it is introduced into a mold.

10. The method of producing crackled ware which comprises forcibly projecting fine streams of liquid against a glass blank and then subjecting the glass to heat.

11. The method of making crackled ware which consists in gathering glass upon a blow pipe, marvering it, introducing air into the gather to form a hollow glass blank, throwing streams of liquid against the hollow glass blank of a quality and quantity sufficient to produce crackling in the blank without changing the temperature of the blank to a degree that will prevent proper shaping thereof, heating the blank, placing the blank in a mold and blowing it to final shape, and then finishing the article in the usual manner.

In testimony whereof we hereto affix our signatures.

VIRGIL O. CORNWELL.
FRED J. BLACKBURN.